United States Patent [19]

Mattern

[11] 4,135,567

[45] Jan. 23, 1979

[54] METHOD OF EVAPORATING AND/OR CONCENTRATING WATER-CONTAINING LIQUIDS

[75] Inventor: Konrad Mattern, Bad Homburg, Germany

[73] Assignee: Ekono Oy, Helsinki, Finland

[21] Appl. No.: 784,598

[22] Filed: Apr. 4, 1977

[30] Foreign Application Priority Data

Apr. 5, 1976 [DE] Fed. Rep. of Germany ....... 2614587

[51] Int. Cl.² ............................................. B01D 1/14
[52] U.S. Cl. ..................................... 159/165; 159/49; 159/27 B; 159/27 D; 159/28 VH; 159/28 R
[58] Field of Search ................ 159/13 R, 13 A, 13 C, 159/16 R, 16 S, 28 A, 28 D, 28 VH, 28 R, 49, 27 B, 27 D, 27 R

[56] References Cited

U.S. PATENT DOCUMENTS

| | | | |
|---|---|---|---|
| 2,177,664 | 10/1939 | Lee ....................................... | 159/16 S |
| 2,886,297 | 5/1959 | Crandall .............................. | 159/13 C |
| 2,941,873 | 6/1960 | Brown et al. ....................... | 159/16 S |
| 3,016,067 | 1/1962 | Edmonds ............................ | 159/13 A |
| 3,530,923 | 9/1970 | Mattern ............................ | 159/28 VH |
| 3,724,523 | 4/1973 | Mattern ............................. | 159/13 A |
| 3,875,988 | 4/1975 | Machida et al. .................... | 159/13 A |

Primary Examiner—Norman Yudkoff
Attorney, Agent, or Firm—Karl F. Ross

[57] ABSTRACT

A method of concentrating or evaporating water from water-containing liquids in a falling-stream or falling-film evaporator through which the liquid is caused to pass downwardly through ribbed tubes which are heated externally. The material to be evaporated is distributed uniformly to the evaporator tubes and driving steam is simultaneously introduced into the latter at a velocity so controlled with respect to the pressure that turbulence develops at the inlet to the tubes. The mixture of the material to be evaporated and drive steam is caused to rotate about the longitudinal axis of the evaporator tubes as the mixture traverses same and the concentrated product is separated from the steam and product vapors at the outlet end of the tubes.

4 Claims, 5 Drawing Figures

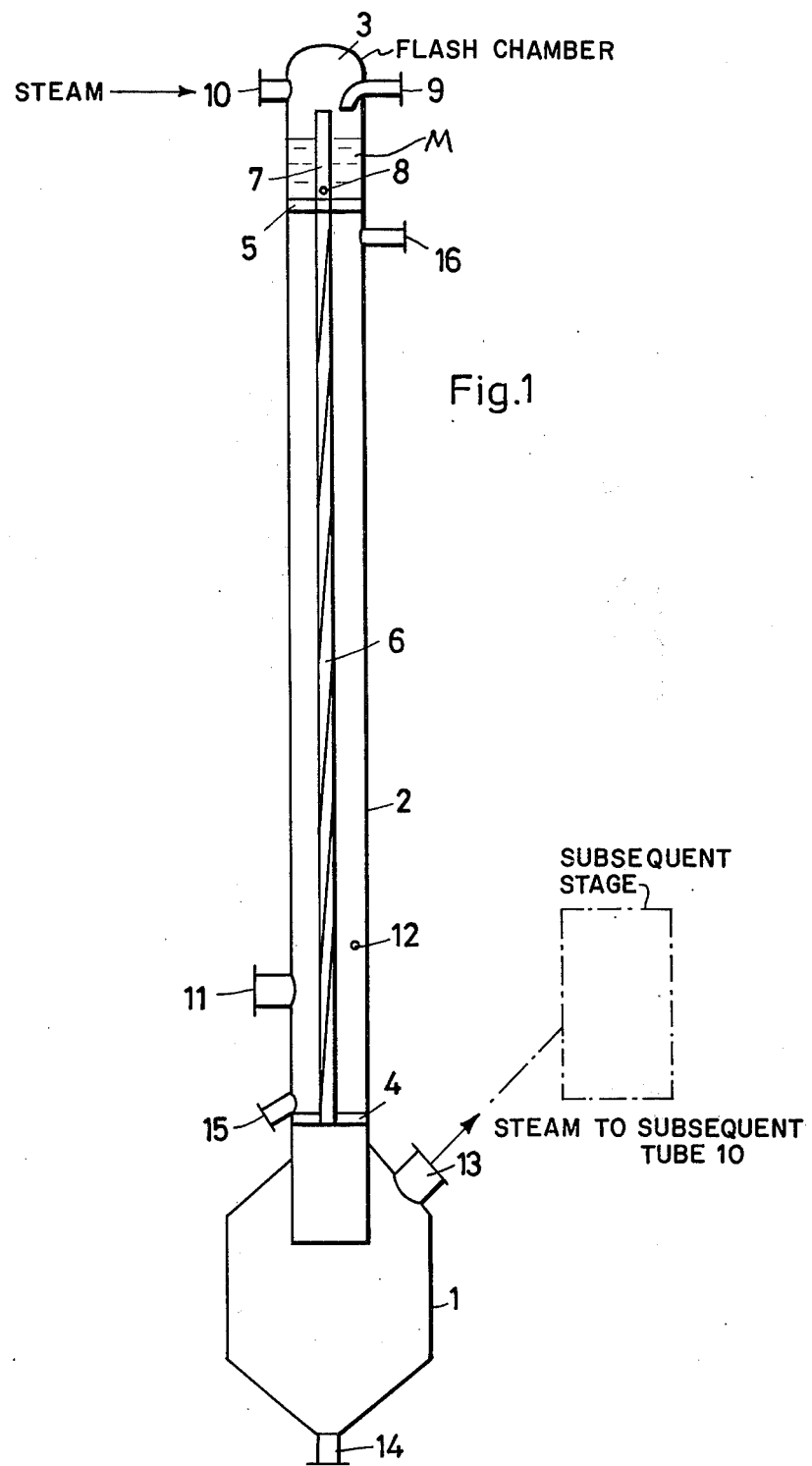

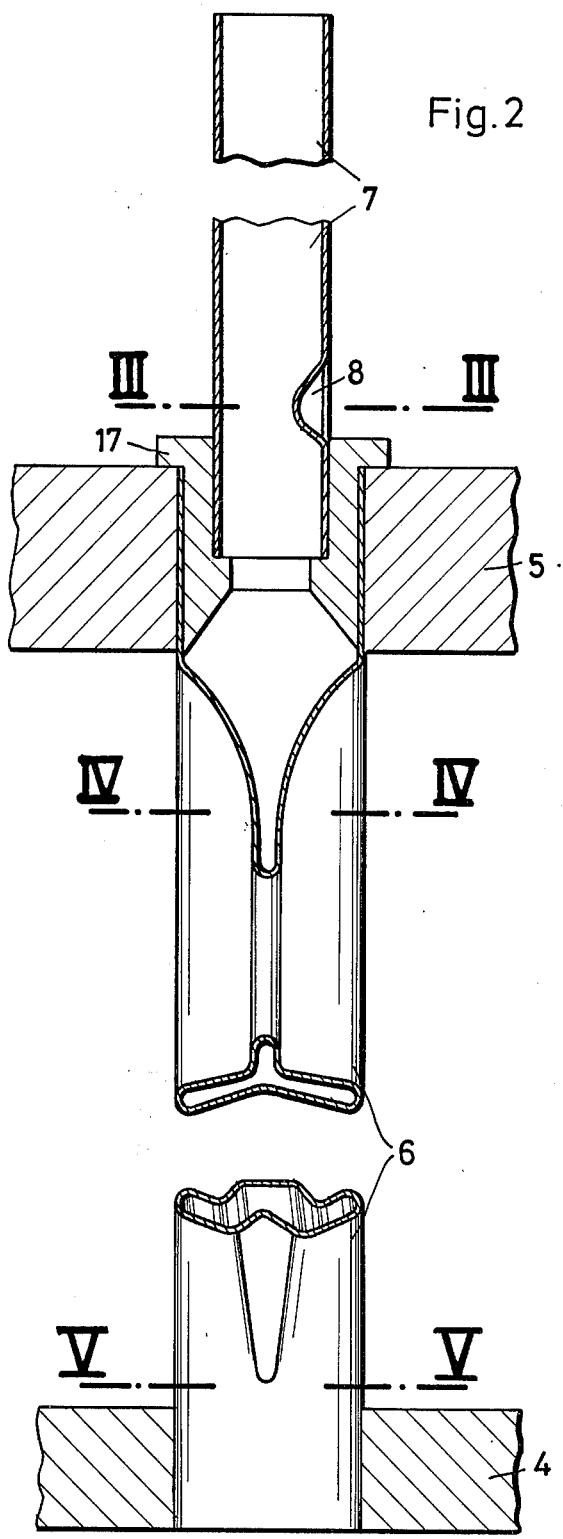
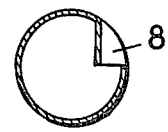
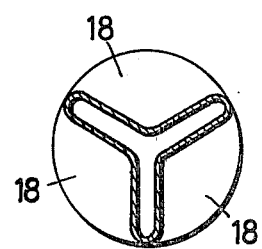
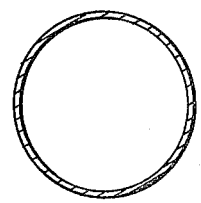

METHOD OF EVAPORATING AND/OR CONCENTRATING WATER-CONTAINING LIQUIDS

CROSS-REFERENCE TO RELATED APPLICATIONS

This application is related to application Ser. No. 765,596 filed Feb. 4, 1977 by Konrad MATTERN, the present applicant, together with Helmut SAFT. The invention also relates to the tube structure for film evaporators described in U.S. Pat. No. 3,724,523.

FIELD OF THE INVENTION

The present invention relates to a process for the concentration of water-containing liquids and hence to the evaporation of vaporizable components therefrom especially in falling-stream evaporators of the tube-bundle type and especially falling-film evaporators as described in the aforementioned copending application and U.S. Letters Patent. More particularly, the invention relates to a process for the purposes described which is carried out in evaporator tubes having ribs or troughs.

BACKGROUND OF THE INVENTION

It is known to concentrate liquid in tube-bundle evaporators by passing the material to be concentrated or subjected to evaporation through the heating and evaporator tubes of the tubes of the tube bundle while the tube is heated from the exterior and the material to be evaporated releases steam or vapor which is recovered from the tube bundle. An evaporator of this type comprises a heating and evaporator tube bundle which can be provided, as described in German open application (Offenlegungsschrift) DT-OS 19 33 462, with internal troughs or corresponding channels designed for a constant tube perimeter, to afford a progressive increase in the tube cross section in the flow direction.

It is also known to provide heating and evaporator tubes in falling-stream and climbing film evaporators which have helical troughs extending around the tube, the troughs or channels terminating before the ends of these tubes and each tube having three or four such troughs (see German patent DT-PS 15 19 658).

These also permit aqueous liquids to be evaporated to relatively high final concentrations although the evaporation processes are not fully satisfactory. For example, since the material to be evaporated achieve an extremely high viscosity during the process, interruption of the latter is a problem which has frequently arisen. Furthermore, the heating surfaces tend to become soiled and to accumulate deposits so that operation of the unit must be interrupted to permit cleaning and removal of these deposits.

OBJECTS OF THE INVENTION

It is the principal object of the present invention to eliminate these and other disadvantages and to provide a process which can be carried out with conventional apparatus and enable the evaporator of vaporizable components from a liquid and the concentration thereof without difficulty to very high final concentrations.

It is another object of the invention to provide a process of the character described which can be carried out economically and requires no monitoring or supervision.

It is also an object of the invention to provide a process for evaporating a water-containing liquid which is free from the tendency to deposit contaminants upon the heating surface of tube-bundle evaporators.

SUMMARY OF THE INVENTION

These objects and others which will become apparent hereinafter are attained, in accordance with the present invention, in a process for evaporating a water-containing liquid material, i.e., a process for concentrating same, in which the material is passed from an inlet side of a tube bundle to the outlet side thereof and the external surfaces of the tubes of the bundle are heated to evaporate a vaporizable component from the material.

According to the invention, the material to be evaporated is uniformly distributed to evaporator tubes, drive steam is introduced with the material to be evaporated into the evaporator tube, the velocity of the drive steam is so controlled with respect to its pressure that turbulence is generated, at the inlet to each tube resulting in an effective mixture of the drive steam and the material to be evaporated, the resulting mixture is rotated around the longitudinal axis of each evaporator tube as it passes from its inlet end to its outlet end, the rotating material together with the drive steam traverses the evaporator tubes from the inlet ends to the outlet ends, and the high concentrated product, is separated as a liquid phase from the vapor and steam phases.

According to a feature of the invention, the material to be evaporated is fed at a temperature to the chamber above the bundle of evaporator tubes which is sufficiently high that a portion of the water contained in the material evaporates by expansion or pressure reduction directly within this chamber or in the tubes through which the material passes.

In accordance with this aspect of the invention, the expansion or pressure reduction can produce evaporated water (steam) which serves as the drive steam for agitating the material to be evaporated and entraining same through the tube bundle.

Preferably, according to another feature of the invention, the evaporation of the material is carried out in several stages with the steam at elevated pressure recovered from one of the stages being used as the drive steam for another, lower-pressure, stage. Each of the stages is carried out in accordance with the following process steps:

(a) the material to be evaporated is uniformly distributed in the aforementioned chamber to the downwardly extending tubes;

(b) simultaneously the drive steam is introduced into the evaporator tubes;

(c) the velocity of the drive steam is so controlled with respect to the pressure that turbulence is generated at the tube inlets;

(d) the mixture of material to be evaporated and drive steam is rotated about the longitudinal axis of each evaporator tube;

(e) the rotating material to be evaporated together with the drive steam are passed through the evaporator tubes; and (f) the material to be evaporated, now at high concentration, is separated from the steam and vapors.

According to a particularly advantageous embodiment of the invention, the uniform distribution of the material to be evaporated in accordance with step (a) is effected by depositing the material upon an upper tube sheet and permitting the material to pass into the inlets of the down extending evaporator tubes through standpipes with openings above the surface of the upper tube sheet but below the upper ends of these standpipes. When drive steam is introduced into the chamber containing the standpipes, it can pass into the standpipes at their upper end.

The system of the present invention has various advantages. For example, it permits evaporation and concentration of water-containing liquids to extremely high final concentrations. For example, sulfate cellulose-digestion liquors can be concentrated to about 65% by weight dry solids at a concentration which enables safe and efficient combustion of the waste liquor. The evaporation or concentration is effected without interruption of the operation of the apparatus by contamination of the heating surfaces and encrustation. The process is characterized by high efficiency and low cost. The process can be carried out in several stages whereby the drive steam used in one stage may be derived from one or more other stages as the vapors produced therein.

BRIEF DESCRIPTION OF THE DRAWING

The above and other objects, features and advantages of the present invention will become more readily apparent from the following description, reference being made to the accompanying drawing in which:

FIG. 1 is a diagrammatic vertical section through an evaporator operated in accordance with the process of the present invention;

FIG. 2 is a detail view, also in vertical section, drawn to an enlarged scale and showing portions of the standpipe and evaporator tubes according to the invention sectioned along various planes for convenience;

FIG. 3 is a cross-sectional view taken along the line III—III of FIG. 2;

FIG. 4 is a section taken along the line IV—IV of FIG. 2; and

FIG. 5 is a section taken along the line V—V of FIG. 2.

SPECIFIC DESCRIPTION

In FIG. 1 of the drawing, in which single lines have been provided in certain cases to represent wall thickness since the showing of wall thickness would render the system disproportionate, there is illustrated an evaporator of the falling-flow type according to the present invention. Only a single evaporator tube has been illustrated in this evaporator, together with its stand pipe, although it will be understood that, in practice, the apparatus will have a multiplicity of such tubes, each with a respective stand pipe, extending between a pair of tube sheets, each of the tubes having the configuration described below.

The apparatus comprises a vapor/liquid separator 1 surmounted by a housing 2 into which a heating medium can be introduced by, for example, a fitting 11 connected to a source of steam. Depleted steam can be removed at 16 and, where desired, the functions of the fittings 11 and 16 can be reversed so that the steam is introduced at 16 and depleted steam is removed at 11.

The upper end of the housing 2 is closed by an evaporator head 3. Between the head 3 and the housing 2 or heating jacket, there is disposed an upper horizontal tube sheet while a lower horizontal tube sheet is provided at 4 between the housing 2 and the vapor/liquid separator 1.

An array of evaporator tubes extends vertically between the tube sheets 4 and 5, the tubes being represented at 6 and are shown in greater detail in FIGS. 2–5.

Each tube 6 communicates, at its upper end, with a standpipe 7 provided with an opening 8 at its lower end through which the material M to be evaporated passes tangentially into the standpipe 7 for distribution uniformly along the interior of each evaporated tube 6. The principle of operation of the standpipe 7 will be apparent from the aforementioned application Ser. No. 765,596.

The upper ends of the standpipe 7 are open so that steam, introduced via fitting 10, can pass downwardly through the standpipes and the evaporator tubes in the manner previously described as so-called drive steam. Furthermore, at the upper end of each of the evaporated tubes 6, the tangentially introduced material to be evaporated mixes with the drive steam turbulently as has also been described.

The standpipe 7 permits the level of the liquid M to be maintained above the openings 8 so that this material is distributed uniformly to all of the evaporator tubes 6.

The standpipe 7 may be integral (unitary) with the tubes 6 and can be constituted as extensions thereof or can be separate as illustrated in FIG. 2. The material to be evaporated is introduced at a fitting 9, preferably after being preheated so that, upon expansion to the pressure in head 3, a portion of the water in this material is flash-evaporated to produce part of the drive steam.

The concentrated material is withdrawn from the separator 1 via an outlet 14 while vapor recovered at the separator 1 is withdrawn at 13 and can be fed as drive steam to a further evaporator stage similar to FIG. 1 and in which the material is further concentrated. A drain 15 permits discharge of condensates formed by cooling of the heating medium, e.g. superheated steam.

The housing 2, as noted, forms a heating chamber 12 around the evaporator tubes 6 which are formed with troughs of the type described in U.S. Pat. No. 3,724,523 so that the flow cross section progressively increases with a constant perimeter, in the flow direction over the length of the evaporator tube. However, unlike the system of U.S. Pat. No. 3,724,523, the tubes are twisted so that the material is caused to rotate about the tube axis as it passes downwardly along the tubes.

In FIGS. 2–5, the tube construction is shown in somewhat greater detail. In this case, the standpipe 7 is fitted into a socket formed at the upper end of a plug 17 which, in turn, is received in the upper end of the tube 6. The latter has a cylindrical upper end in the region in which the tube 6 is anchored in the upper tube sheet 5 but, immediately below the tube sheet 5 has a Y-trough configuration as has been shown in FIG. 4.

The opening 8 into the standpipe 7 is oriented tangentially (FIG. 3) so that the influx of liquid material to be evaporated from immediately above the tube sheet 5 is effected tangentially.

The troughs become increasingly shallower downwardly along the pipe 6 until they merge into a cylindrical wall toward the lower tube sheet 4 as represented in FIG. 5.

SPECIFIC EXAMPLE

For this example, evaporator tubes 6 were used which have inwardly pressed portions 18, defining the troughs between the planes IV—IV and V—V, which twist about the axis of each tube and are shaped so that the free cross section increases over the length of the tube until the free cross section reaches the maximum of the circular cross section at the tube sheet 4. The standpipe 7 rises 300 mm. above the upper tube sheet 5 and the flow cross section of the opening 8 has an area of 20 mm². The evaporator tubes 6 have a diameter at plane V—V of 32 mm., corresponding to a cross section of 806 mm². At the plane IV—IV the cross section is 135 mm². The distance between the planes IV—IV and V—V is six meters.

600 kg/hour of preconcentrated sulfate cellulose-digestion wast liquor is introduced through the fitting 9 at a pressure of 1 atmosphere absolute and containing 40% dry substance. The material is at its boiling point of about 105° C. Simultaneously, 21 kg/hour of steam is supplied via fitting 10. Sufficient steam is introduced at 11 so that a pressure of about 2.5 atmospheres absolute is maintained in the heating chamber 12.

The material M has a height above the tube sheet 5 of 200mm, the upper ends of the standpipes 7 lying above this liquid level so that the drive steam can pass into the standpipes, turbulently mix with the liquid material at the inlets of the tubes 6, and carry the material downwardly.

The concentrate collected at the separator 1 at a temperature of 115° C. contains 65% dry solids and has a viscosity of 50 centistokes. The vapor phase is separated. The condensate is recovered at fitting 15 while the uncondensed gases are removed from chamber 12 via fitting 16.

Measurements have shown the following parameters:

| | |
|---|---|
| heat transfer value over the total length of the evaporator tubes at the start of the process | $= 2100 \frac{kcal}{m^2 h \cdot C}$ |
| heat transfer value after 112 hours of operation (stand time) | $= 2100 \frac{kcal}{m^2 h \cdot C}$ |
| feed rate | = 600 kg/hour |
| steam velocity at narrowest cross section, i.e. at the inlet region of tubes 6 corresponding to the plane IV - IV in FIG. 2 | = 10 m/sec |
| steam velocity in pipes at the outlet plane V - V (FIG. 2) | = 21 m/sec |

COMPARATIVE EXAMPLE 1

The system of the present invention was compared with the prior-art represented by German Offenlegungsschrift DT-OS 19 33 462, using corresponding pipes without helical or spiral twist of the troughs. The following results were obtained:

| | |
|---|---|
| heat transfer value over the total length of the evaporator tubes at the start of the process | $= 2100 \frac{kcal}{m^2 h \cdot C}$ |
| heat transfer value after 112 hours of operation (stand time) | $= 1100 \frac{kcal}{m^2 h \cdot C}$ |
| possible feed rate at start | = 600 kg/h |
| possible feed rate at the end, after 112 hours | = 310 kg/h |
| steam velocity at the region of tubes at start corresponding to the plane IV - IV FIGS. 2 and 4 | = 10 m/sec |
| steam velocity at region of tube inlet after 112 hours corresponding to the plane IV - IV (FIGS. 2 and 4) | = 5 m/sec |
| steam velocity at region of tube outlet corresponding to the plane V - V (FIGS. 2 and 5 at start) | = 21 m/sec |
| steam velocity at region of tube outlet after 112 hours corresponding to the plane V - V (FIGS. 2 and 5) | = 10 m/sec. |

COMPARATIVE EXAMPLE 2

The process was represented except that pipes of constant cross section were substituted for the evaporator tube 6. The cross section was 806 mm² over the entire length. The following results were obtained:

| | |
|---|---|
| heat transfer value over the total length of the tubes at the start of the process | $= 1100 \frac{kcal}{m^2 h \cdot C}$ |
| heat transfer value after 112 hours (stand time) | $= 850 \frac{kcal}{m^2 h \cdot C}$ |
| feed rate at start | = 310 kg/h |
| steam velocity at region of tube inlet, at start, corresponding to the plane IV - IV (FIG. 2) | = 1.65 m/sec |
| steam velocity at region of tube outlet corresponding to the plane V - V (FIG. 2) | = 12 m/sec. |

The significance of the present invention will be immediately apparent from a comparison of the Example of the present invention with comparative Examples 1 and 2. Comparative Example 1 shows that, while the same heat transfer values are obtained as in the invention Example, the duration over which the system can be employed because of increasing encrustation of the heating surfaces, is substantially lower. Hence, the system of the invention sharply increases operating time. Comparative Example 2 indicates that the desired concentration characteristics cannot be obtained with ordinary smooth-wall tubes of constant cross section.

We claim:
1. A process for the concentration of a water-containing liquid material which comprises the steps of:
   (a) distributing said material uniformly to inlet ends of a plurality of evaporator tubes formed with troughs and having flow cross sections increasing from the respective inlet ends to respective outlet ends with substantially constant perimeters;
   (b) simultaneously introducing driving steam into said evaporator tubes at said inlet ends;
   (c) controlling the velocity of said driving steam with respect to the pressure thereof to induce turbulence in the material passing into said evaporator tubes at said inlet ends and forming a mixture of said material with said driving steam;
   (d) rotating said mixture about the axis of each of the evaporator tubes;
   (e) passing the rotating mixture along said evaporator tubes from said inlet ends to said outlet ends and recovering a concentrated produce and vapor from said outlet ends of said tubes; and

(f) separating said concentrated product from said vapor and withdrawing said concentrated product, said material being introduced into a space communicating with said inlet ends of said evaporator tubes at a temperature such that water contained in said material is flash-evaporated in said space, said tubes being upright and each being formed with respective standpipes extending above a tube sheet, said material being uniformly distributed to said tubes by maintaining a layer of said material on said tube sheet and feeding said material tangentially to each of said pipes through an opening in the respective standpipe below the upper surface of said layer, said drive steam being introduced in step (b) into said tubes through upper open ends of said standpipes.

2. The process defined in claim 1 wherein at least part of the drive steam used in step (b) is formed by evaporation of water from said material.

3. The process defined in claim 1 wherein the concentration is carried out in a plurality of stages and steam recovered from a stage at higher pressure is fed to a stage at lower pressure as the drive steam in step (b) thereof.

4. An apparatus for evaporating water from a water-containing liquid material and thereby concentrating said material, said apparatus comprising:

an upright elongated housing defining a heating chamber and formed with a first fitting for the introduction of heating steam, a second fitting for discharging depleted steam, and a third fitting for draining condensate from said chamber;

a multiplicity of vertical evaporator tubes extending through said chamber and heated by steam therein, each of said evaporator tubes being formed with a plurality of troughs which become increasingly shallow from the upper end to the lower end of each evaporator tube, the troughs of each evaporator tube spiraling around the axis thereof from the upper end to the lower end of each tube, said heating tubes each having a flow cross section increasing progressively from the respective upper end to the respective lower end for a substantially constant perimeter;

respective tube sheets carrying said tubes at the upper and lower ends thereof;

means defining a space above said upper tube sheet;

respective standpipes connected to the upper ends of each of said tubes and rising from said upper tube sheet in said space, said standpipes each being formed with a respective open end and a tangential opening lying proximal to said upper tube sheet;

means for introducing drive steam into said tubes through the open ends of said standpipes;

means for feeding said material to said space above said upper tube sheet whereby said material forms a layer in said space having an upper surface above said opening, and a liquid/vapor separator disposed below said lower tube sheet and collecting a mixture of concentrate and vapor from said tubes, a further fitting for draining said concentrate from said separator, and means for removing vapor from said separator.

* * * * *